United States Patent
Zhang et al.

(10) Patent No.: US 10,110,143 B2
(45) Date of Patent: Oct. 23, 2018

(54) SYNCHRONOUS RECTIFIER CIRCUIT AND CONTROL METHOD THEREOF

(71) Applicant: Silergy Semiconductor Technology (Hangzhou) LTD, Hangzhou, ZheJiang Province (CN)

(72) Inventors: Wang Zhang, Hangzhou (CN); Chen Zhao, Hangzhou (CN)

(73) Assignee: Silergy Semiconductor Technology (Huangzhou) LTD, Hangzhou (CN)

( * ) Notice: Subject to any disclaimer, the term of this patent is extended or adjusted under 35 U.S.C. 154(b) by 0 days.

(21) Appl. No.: 15/477,007

(22) Filed: Apr. 1, 2017

(65) Prior Publication Data

US 2017/0302193 A1   Oct. 19, 2017

(30) Foreign Application Priority Data

Apr. 18, 2016  (CN) .......................... 2016 1 0240272

(51) Int. Cl.
| | |
|---|---|
| *H02M 7/04* | (2006.01) |
| *H02M 7/219* | (2006.01) |
| *H02J 7/02* | (2016.01) |
| *H02M 1/08* | (2006.01) |
| *H02M 1/00* | (2006.01) |

(52) U.S. Cl.
CPC .............. *H02M 7/219* (2013.01); *H02J 7/025* (2013.01); *H02M 1/08* (2013.01); *H02M 2001/0009* (2013.01); *H02M 2007/2195* (2013.01)

(58) Field of Classification Search
CPC .. H02M 1/08; H02M 2007/2195; H02J 7/219; Y02B 70/1408

USPC ...... 363/16–17, 21.06, 21.14, 37–39, 81–89, 363/127–132; 323/205, 207, 222, 224, 323/226, 237

See application file for complete search history.

(56) References Cited

U.S. PATENT DOCUMENTS

| | | | | |
|---|---|---|---|---|
| 5,739,650 | A * | 4/1998 | Kimura | H02P 6/08 318/400.07 |
| 6,490,183 | B2 * | 12/2002 | Zhang | H02M 3/33592 363/127 |
| 7,269,038 | B2 * | 9/2007 | Shekhawat | H02M 1/42 363/71 |
| 8,023,289 | B2 | 9/2011 | Yang et al. | |
| 8,154,888 | B2 | 4/2012 | Yang et al. | |
| 9,236,804 | B2 * | 1/2016 | Pal | H02M 3/33515 |
| 9,246,394 | B2 | 1/2016 | Deng | |
| 9,270,166 | B2 * | 2/2016 | Wang | H02M 1/4225 |
| 9,350,263 | B2 * | 5/2016 | Tang | H02M 7/219 |

(Continued)

*Primary Examiner* — Rajnikant Patel
(74) *Attorney, Agent, or Firm* — Michael C. Stephens, Jr.

(57) ABSTRACT

A synchronous rectifier circuit can include: a full-bridge rectifier circuit having first, second, third, and fourth switches, where a common node of the first and fourth switches is configured as a first input terminal of the synchronous rectifier circuit, and a common node of the second and third switches is configured as a second input terminal of the synchronous rectifier circuit; a switching control circuit configured to generate a first control signal to control the first and third switches, and a second control signal to control the second and fourth switches; and the switching control circuit being configured to self-adjust the first and second control signals to control operating points of the first, second, third, and fourth switches to be approximately ideal operating points.

15 Claims, 15 Drawing Sheets

(56) References Cited

U.S. PATENT DOCUMENTS

| | | |
|---|---|---|
| 2003/0117119 A1 | 6/2003 | Bridge |
| 2012/0326515 A1* | 12/2012 | Murai .................... H02J 5/005 |
| | | 307/72 |
| 2014/0078788 A1 | 3/2014 | Yao |
| 2014/0268956 A1* | 9/2014 | Teren .................... H02M 7/219 |
| | | 363/89 |

* cited by examiner

SYNCHRONOUS RECTIFIER CIRCUIT AND CONTROL METHOD THEREOF

RELATED APPLICATIONS

This application claims the benefit of Chinese Patent Application No. 201610240272.8, filed on Apr. 18, 2016, which is incorporated herein by reference in its entirety.

FIELD OF THE INVENTION

The present invention generally relates to the field of power electronics, and more particularly to synchronous rectifier circuits and methods.

BACKGROUND

A rectifier circuit is used to convert an AC power signal to a DC power signal. A traditional rectifier circuit is a half-bridge or a full-bridge rectifier circuit that uses diodes. In a positive half-cycle of an AC power, a current flows from an input terminal of a rectifier circuit to an output terminal of the rectifier circuit through different paths as determined by diodes, so that a directional DC current is obtained at the output terminal. The rectifier circuit with diodes takes advantages of a relatively simple structure and low product costs, but still may have relatively low power efficiency because of the large losses consumed by the diodes.

DETAILED DESCRIPTION

Figure 1:
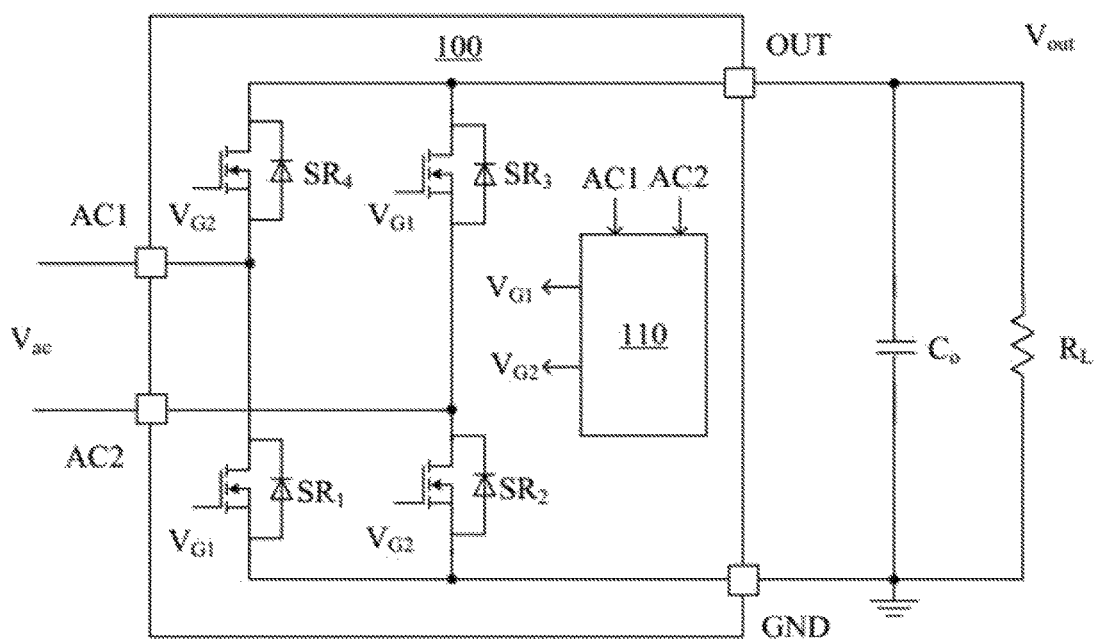
FIG. 1 is a schematic block diagram of an example synchronous rectifier circuit.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A synchronous rectifier circuit is a rectifier circuit with switches instead of diodes. Thus, the system efficiency can be improved since the power losses are reduced by using switches with relatively low on resistances. For example, a synchronous rectifier circuit can be a full-bridge rectifier circuit with four switches. Each of the switches can be controlled to turn on or off according to a control signal. In order to enable the function of rectifier, the control signal for switches has the same phase as the AC current at the input terminal.

The synchronous rectifier circuit may utilize a switching control circuit to generate the control signal for switches. For example, the switches may be metal oxide semiconductor (MOS) transistors, and parasitic body diodes can exist between sources and drains of the switches. In a typical synchronous rectifier circuit, switches can be turned on when body diodes are detected to be on, and turned off when currents flowing through the switches are detected to be close to zero.

In wireless charging applications, high frequency signals may be used to transmit electrical energy between a power transmitter and a power receiver. A current detection signal can be processed by the switching control circuit of the synchronous rectifier circuit, and may include a comparing step, a transmitting step, a driving step, and so on. In addition, unlike an ideal turn on and off type of control, the control signal may be delayed. Thus, the power losses may increase when the synchronous rectifier circuit is used in a high-frequency AC power application. Therefore, the synchronous rectifier circuit can be improved by compensating the delay of the control signal with the switching control circuit, and may further reduce power losses in the high-frequency AC power application.

In one embodiment, a synchronous rectifier circuit can include: (i) a full-bridge rectifier circuit having first, second, third, and fourth switches, where a common node of the first and fourth switches is configured as a first input terminal of the synchronous rectifier circuit, and a common node of the second and third switches is configured as a second input terminal of the synchronous rectifier circuit; (ii) a switching control circuit configured to generate a first control signal to control the first and third switches, and a second control signal to control the second and fourth switches; and (iii) the switching control circuit being configured to self-adjust the first and second control signals to control operating points of the first, second, third, and fourth switches to be approximately ideal operating points.

In one embodiment, a method of controlling a synchronous rectifier circuit for converting an AC input voltage to a DC input voltage and having first, second, third, and fourth switches configured to form a full-bridge rectifier circuit, can include: (i) generating a first control signal according to the AC input voltage; (ii) generating a second control signal according to the AC input voltage; (iii) controlling the first and third switches by the first control signal; (iv) controlling the second and fourth switches by the second control signal; and (v) self-adjusting the first and second control signals to control operating points of the first, second, third, and fourth switches to approximately be ideal operating points.

Referring now to FIG. 1, shown is a schematic block diagram of an example synchronous rectifier circuit. For example, synchronous rectifier circuit 100 may be used in an electronic transformer, or as an energy receiver in a wireless charging device. In an electronic transformer, an external power supply may provide AC power to synchronous rectifier circuit 100. In a wireless charging device, a receiving coil at the energy receiver may provide AC power to synchronous rectifier circuit 100. In FIG. 1, synchronous rectifier circuit 100 can receive AC input voltage $V_{ac}$ at its input terminal, and may provide a DC ripple voltage at its output terminal. A relatively smooth DC output voltage $V_{out}$ can be provided to load $R_L$ after being filtered by output capacitor $C_o$.

Synchronous rectifier circuit 100 can include switches $SR_1$, $SR_2$, $SR_3$, and $SR_4$, and these four switches (e.g., N-type MOS transistors) may form a full-bridge rectifier circuit. For example, switches $SR_1$ and $SR_4$ can form a first bridge arm, and switches $SR_2$ and $SR_3$ may form a second bridge arm. Synchronous rectifier circuit 100 can also include switching control circuit 110. A common node of switches $SR_1$ and $SR_4$ can be a first input terminal (e.g., AC1) of the synchronous rectifier circuit, and a common node of switches $SR_2$ and $SR_3$ can be a second input terminal (e.g., AC2) of synchronous rectifier circuit 100. The first and second input terminals can receive AC input voltage Vin. A common node of switches $SR_3$ and $SR_4$ can be a first output terminal (e.g., OUT) of the synchronous rectifier circuit, and a common node of switches $SR_1$ and $SR_2$ can be a second output terminal (e.g., GND) of synchronous rectifier circuit 100. Switching control circuit 110 can generate control signals $V_{G1}$ and $V_{G2}$ for controlling the switching states of the four switches according to the voltages at the first and second input terminals. For example, control signal VG1 can control the switching states of switches $SR_1$ and $SR_3$, and control signal $V_{G2}$ can control the switching states of switches $SR_2$ and $SR_4$.

Figure 2:
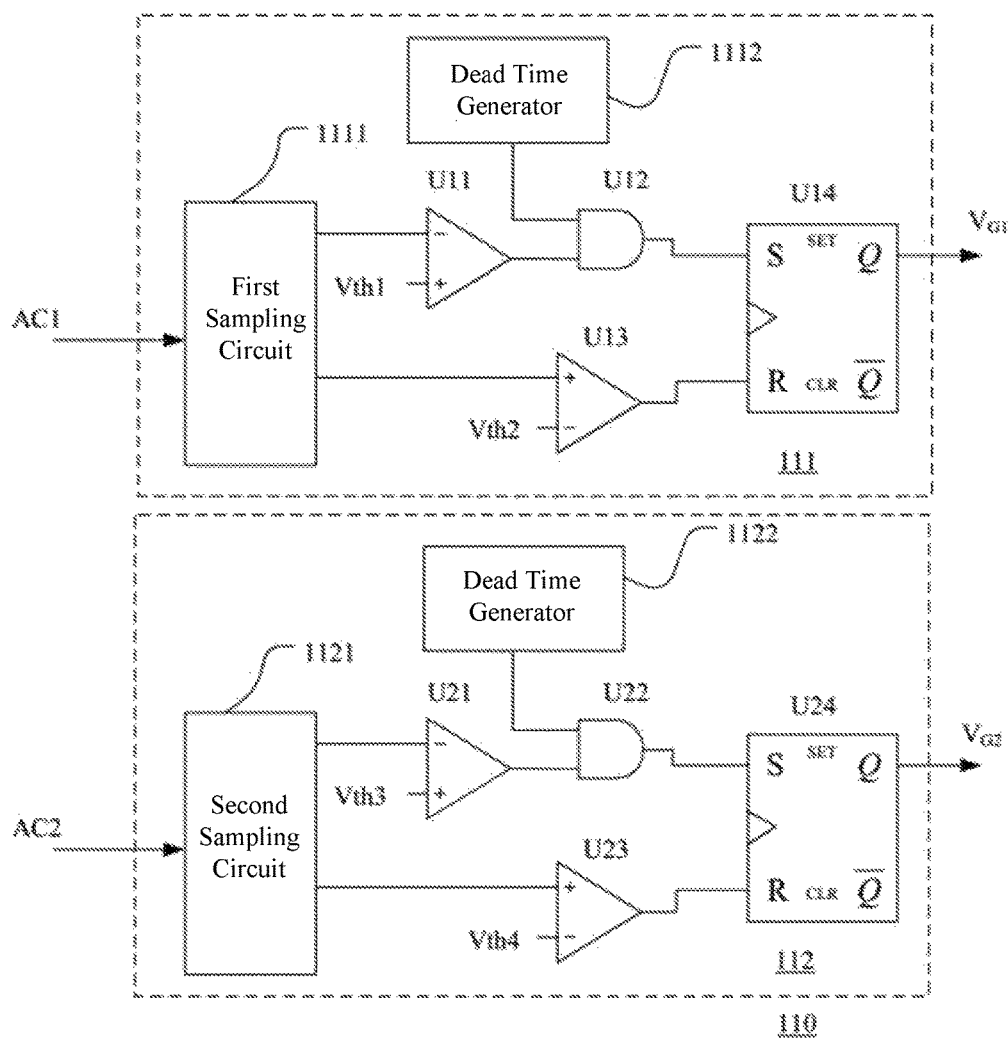
FIG. 2 is a schematic block diagram of an example switching control circuit used in a synchronous rectifier circuit.

Referring now to FIG. 2, shown is a schematic block diagram of an example switching control circuit used in a synchronous rectifier circuit. Switching control circuit 110 can include control circuit 111 for generating control signal $V_{G1}$ according to an input signal at input terminal AC1, and control circuit 112 for generating control signal $V_{G2}$ according to an input signal at input terminal AC2. Control circuit 111 can include sampling circuit 1111, dead time generator 1112, comparators U11 and U13, AND-gate U12, and RS flip-flop U14. Sampling circuit 1111 can connect to the first input terminal, and may generate a first sampling signal that represents AC input voltage $V_{ac}$ during the positive half-cycle of AC input voltage $V_{ac}$. Dead time generator 1112 can generate a time interval (e.g., a dead time) between the on time of switches $SR_1$ and $SR_3$, and the on time of switches $SR_2$ and $SR_4$. During the dead time, switches $SR_1$-$SR_4$ may all be off, such that a possible false circumstance that all the switches are on can be avoided.

In control circuit 111, comparator U11 can receive the first sampling signal at its inverting input terminal, and threshold voltage Vth1 at its non-inverting input terminal, and may generate a first comparison signal at its output terminal. AND-gate U12 can receive the first comparison signal and a dead time signal at its two input terminals, and may generate an on signal when both signals are active. Comparator U13 can receive the first sampling signal at its non-inverting input terminal, and threshold voltage Vth2 at its inverting input terminal, and may generate a second comparison signal (e.g., an off signal) at its output terminal. RS flip-flop U14 receives the on signal at its set terminal S, and the off signal at its reset terminal R, and may provide control signal $V_{G1}$ at its output terminal Q.

Control circuit 112 can include sampling circuit 1121, dead time generator 1122, comparators U21 and U23, AND-gate U22, and RS flip-flop U24. Sampling circuit 1121 can connect to the second input terminal, and may generate a second sampling signal that represents AC input voltage $V_{ac}$ during the negative half-cycle of the AC input voltage $V_{ac}$. Dead time generator 1122 can generate a time interval (e.g., a dead time) between the on time of switches $SR_2$ and $SR_4$, and the on time of switches $SR_1$ and $SR_3$. During the dead time, switches $SR_1$-$SR_4$ may all be off, such that the possible false circumstance of all the switches being on can be avoided.

In control circuit 112, comparator U21 can receive the second sampling signal at its inverting input terminal, and threshold voltage Vth3 at its non-inverting input terminal, and may generate a third comparison signal at its output terminal. AND-gate U22 can receive the third comparison signal and a dead time signal at its two input terminals, and may generate an on signal when both signals are active. Comparator U23 can receive the second sampling signal at its non-inverting input terminal, and threshold voltage Vth4 at its inverting input terminal, and may generate a fourth comparison signal (e.g., an off signal) at its output terminal. RS flip-flop US14 can receive the on signal at its set terminal S, and the off signal at its reset terminal R, and may provide control signal $V_{G2}$ at its output terminal Q. In switching control circuit 110, switches $SR_1$ and $SR_3$, and switches $SR_2$ and $SR_4$ can be alternately turned on and off.

During the positive half-cycle of AC input voltage $V_{ac}$, when the input signal at the first input terminal is less than threshold voltage Vth1 and the predetermined dead time has elapsed, control circuit 111 activate control signal $V_{G1}$ in order to turn on both of switches $SR_1$ and $SR_3$. When the input signal at the first input terminal is greater than the second threshold voltage, control circuit 111 can deactivate control signal $V_{G1}$ in order to turn off both of switches $SR_1$ and $SR_3$. In this way, during the positive half-cycle of AC input voltage $V_{ac}$, switches $SR_1$ and $SR_3$ can be on, while switches $SR_2$ and $SR_4$ are off. If AC input voltage $V_{ac}$ at the input terminal of the synchronous rectifier circuit is a sine wave, a half-sine wave may be generated at the output terminal of the synchronous rectifier circuit during the positive half-cycle of AC input voltage $V_{ac}$.

Similarly, during the negative half-cycle of AC input voltage $V_{ac}$, when the input signal at the second input terminal is less than threshold voltage Vth3 and the predetermined dead time has elapsed, control circuit 112 can activate control signal $V_{G2}$ such that switches SR2 and SR4 are both on. When the input signal at the second input terminal is greater than the fourth threshold voltage, control circuit 112 may deactivate control signal $V_{G2}$ such that switches $SR_2$ and $SR_4$ are both off. In this way, during the negative half-cycle of AC input voltage $V_{ac}$, switches $SR_2$ and $SR_4$ may both be on, while switches $SR_1$ and $SR_3$ are off. If AC input voltage $V_{ac}$ at the input terminal of the synchronous rectifier circuit is a sine wave, a half-sine wave can be generated at the output terminal of the synchronous rectifier circuit during the negative half-cycle of AC input voltage $V_{ac}$. For example, threshold voltages Vth1 and Vth3 can be less than zero (e.g., about −30 mv), and threshold voltages Vth2 and Vth4 may be greater than zero (e.g., about 10 mv).

Figure 3:
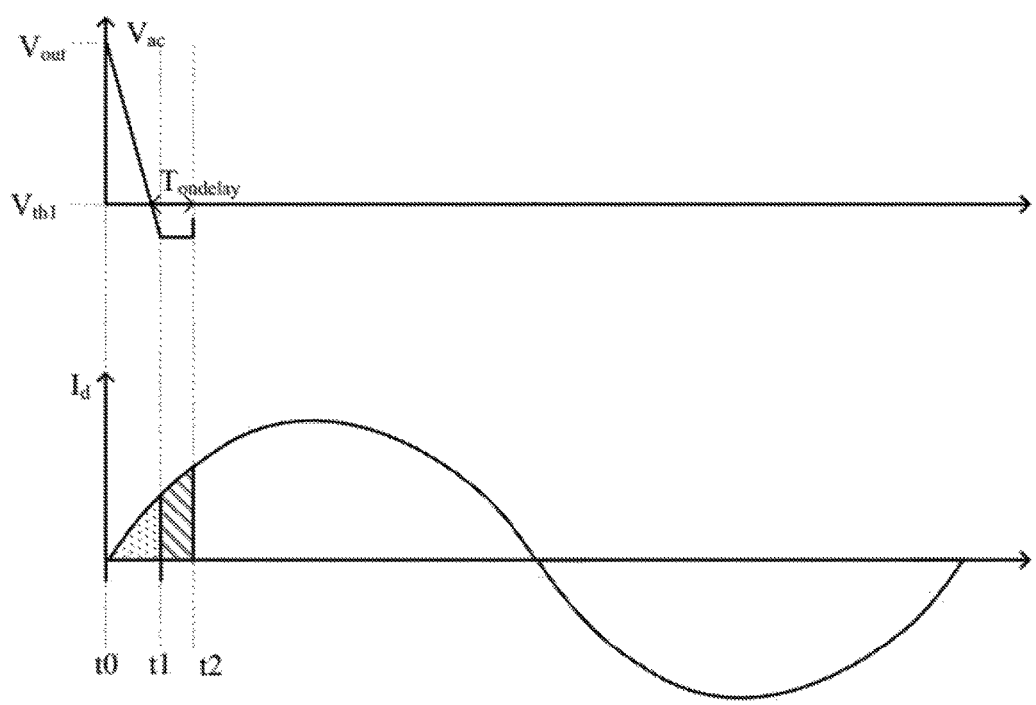
FIGS. 3 and 4 are waveform diagrams of example operation of switches of a synchronous rectifier circuit in on and off stages, respectively.
Figure 4:
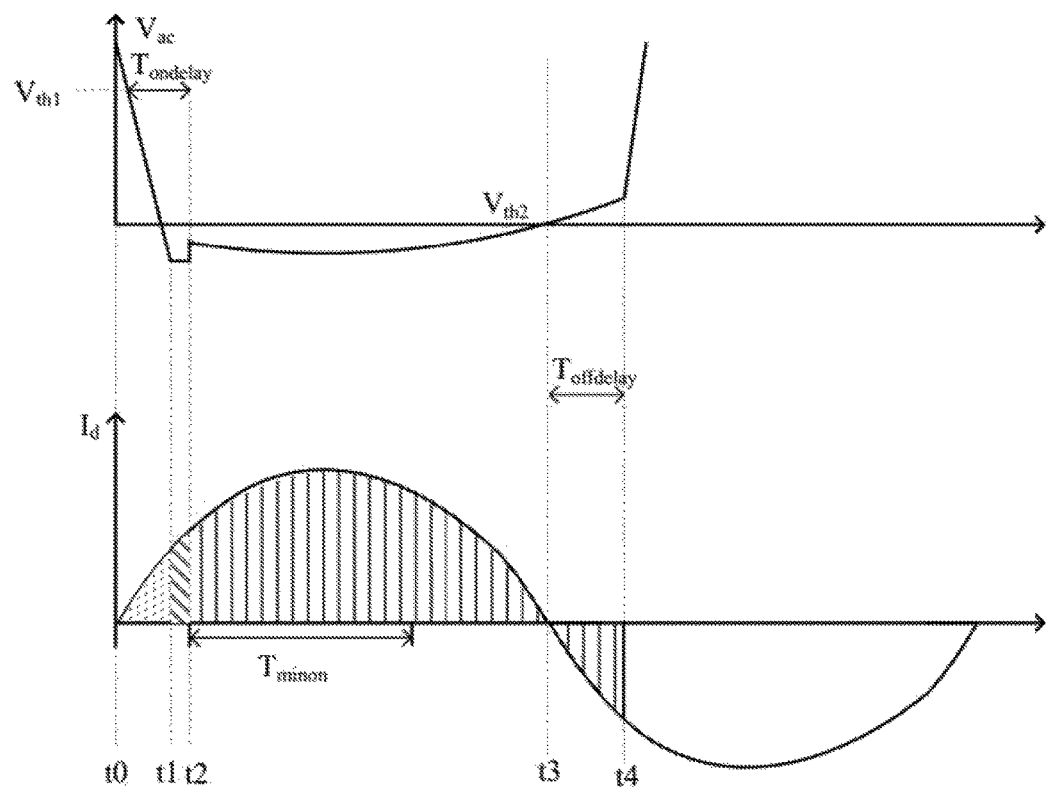

Referring now to FIGS. 3 and 4, shown are waveform diagrams of example operation of switches of a synchronous rectifier circuit in on and off stages, respectively. These examples show the variation procedure AC input voltage $V_{ac}$ and AC input current $I_d$. Since control circuits 111 and 112 may have the same or similar operating principles, control circuit 111 will be described as an example herein to explain the delay of the operating point of control signal $V_{G1}$ with respect to the ideal operating point.

In FIG. 3, from time t0 to time t1, the synchronous rectifier circuit may be in a commutation state, and switches $SR_1$ and $SR_3$ are off. AC input voltage $V_{ac}$ may drop at a certain descending speed, which is not a fixed value, but is related to various factors (e.g., a load current, a switch junction capacitance, etc.). Comparator U11 in control circuit 111 can compare the first sampling signal against threshold voltage Vth1. When AC input voltage $V_{ac}$ is detected to be less than threshold voltage Vth1 (e.g., about −30 mV), switches $SR_1$ and $SR_3$ are ready to be turned on. The current detection signal can be processed by the control circuit, and may include a comparing step, a transmitting step, a driving step and so on, and the control signal may be delayed with respect to the ideal turning on moment. Therefore, from time t1 to time t2, switches $SR_1$ and $SR_3$ may still be off, but the body diodes of switches $SR_1$ and $SR_3$ can already be turned on.

At time t2, switches $SR_1$ and $SR_3$ are both on. When the synchronous rectifier circuit starts rectifying during the positive half-cycle, control signal $V_{G1}$ can be activated. On delay $T_{ondelay}$ can exist between time t2 at which control signal $V_{G1}$ is activated, and time t1 at which the first sampling signal of sampling circuit 1111 indicates that AC input voltage $V_{ac}$ is less than threshold voltage Vth1. Delay $T_{ondelay}$ between the actual on point and the ideal on point of control signal $V_{G1}$ may lead to increased switching losses in the on stage of the synchronous rectifier circuit. If AC input voltage $V_{ac}$ is a high frequency signal, the switching losses may significantly reduce the system efficiency.

In FIG. 4, from time t2 to time t3, the synchronous rectifier circuit can be in a rectifier state of the positive half-cycle, and switches $SR_1$ and $SR_3$ are both on. The voltages at the input and output terminals of the synchronous rectifier circuit may vary and not be fully synchronized. In the rectifier stage of the positive half-cycle, AC input voltage $V_{ac}$ can begin increasing and then decreasing. Comparator U13 in control circuit 111 can compare the first sampling signal against threshold voltage Vth2. At time t3, when AC input voltage $V_{ac}$ is detected to be greater than threshold voltage Vth2 (e.g., about 10 mv), switches $SR_1$ and $SR_3$ can be ready to be turned off.

At time t4, synchronous rectifier circuit may complete rectification during the positive half-cycle, and control signal $V_{G1}$ can be deactivated. Because the steps of processing the current detection signal by the control circuit can include a comparing step, a transmitting step, a driving step and so on, the control signal may be delayed with respect to the ideal turning off moment. That is, off delay $T_{offdelay}$ can exist between the time t4 at which control signal $V_{G1}$ is deactivated, and time t3 at which the first sampling signal of sampling circuit 1111 indicates that AC input voltage $V_{ac}$ is greater than threshold voltage Vth2. Delay $T_{offdelay}$ between the actual off point and the ideal off point of control signal $V_{G1}$ may lead to increased switching losses in the off stage of the synchronous rectifier circuit. If AC input voltage $V_{ac}$ is a high frequency signal, the switching losses may significantly reduce the system efficiency.

Figure 5:
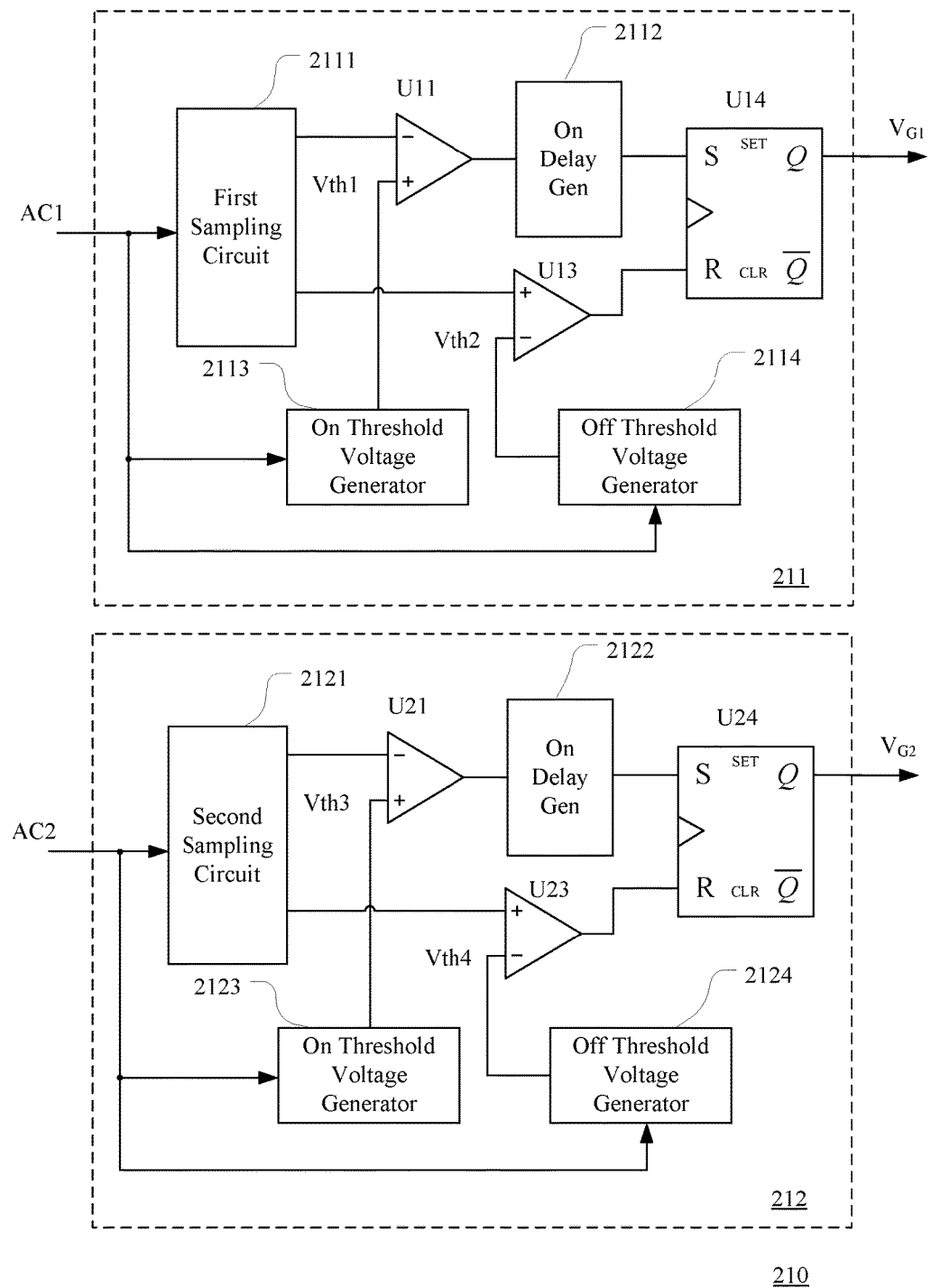
FIG. 5 is a schematic block diagram of a first example switching control circuit used in a synchronous rectifier circuit, in accordance with embodiments of the present invention.

Referring now to FIG. 5, shown is a schematic block diagram of a first example switching control circuit used in a synchronous rectifier circuit, in accordance with embodiments of the present invention. Switching control circuit 210 can include control circuit 211 for generating control signal $V_{G1}$ according to an input signal at input terminal AC1, and control circuit 212 for generating control signal $V_{G2}$ according to an input signal at input terminal AC2. Control circuit 211 can include sampling circuit 2111, on delay generator 2112, on threshold voltage generator 2113, off threshold voltage generator 2114, comparators U11 and U13, and RS flip-flop U14.

Sampling circuit 2111 can connect to the first input terminal, and can generate a first sampling signal for representing AC input voltage $V_{ac}$ during the positive half-cycle of AC input voltage $V_{ac}$. On delay generator 2112 can generate a time interval (e.g., a commutation delay) between the on time of switches $SR_1$ and $SR_3$, and the on time of switches $SR_2$ and $SR_4$. During the commutation delay, switches $SR_1$-$SR_4$ may all be off, such that that the possible false circumstance of all the switches being on can be avoided. Control circuit 212 can include sampling circuit 2121, on delay generator 2112, on threshold voltage generator 2113, off threshold voltage generator 2114, comparators U21 and U23, and RS flip-flop U24.

Sampling circuit 2121 can connect to the second input terminal, and can generate a second sampling signal that represents AC input voltage $V_{ac}$ during the negative half-cycle of AC input voltage $V_{ac}$. On delay generator 2112 can generate a time interval (e.g., a commutation delay) between the on time of switches $SR_2$ and $SR_4$, and the on time of switches $SR_1$ and $SR_3$. During the commutation delay, switches $SR_1$-$SR_4$ may all be off, such that the possible false circumstance that all the switches being on can be avoided. In this example, switching control circuit 210, and in particular control circuits 211 and 212, can also include on threshold voltage generator 2113 and off threshold voltage generator 2114, for generating adjustable threshold voltages. In this way, the operating point of control signal $V_{G1}$ can be regulated according to the variation of AC input voltage $V_{ac}$.

On delay generator 2112 may generate a time interval between the on time of switches $SR_1$ and $SR_3$, and the on time of switch $SR_2$ and time switch $SR_4$, such as for delaying the first comparison signal. During the delay stage of the first comparison signal, switches $SR_1$ and $SR_4$ may both be off, such that the possible false circumstance of all the switches being on can be avoided. For example, in control circuit 211, on threshold voltage generator 2113 can generate adjustable threshold voltage Vth1 according to AC input voltage $V_{ac}$. Also, off threshold voltage generator 213 can generate adjustable threshold voltage Vth2 according to AC input voltage $V_{ac}$.

During the on stage of the switches, if the on point of the switch is delayed with respect to the ideal on point, the body diode of the switch may be turned on in advance. During the off stage of the switches, if the off point of the switch is delayed with respect to the ideal off point, the body diode of the switch may be turned off in advance. As the body diode is turned on in the function of the bias voltage, the turning on/off moments of the body diode may not be affected by the delay of the control circuit, and instead, may always near the ideal on point and the ideal off point.

When the switch is off but its body diode is turned on, the synchronous rectifier circuit may be used as the load of the AC input voltage, so the AC input voltage can be approximately constant. Thus, the on state of the body diode of the switch can be detected according to the variation of the AC input voltage, to further determine the ideal on point and off point. On threshold voltage generator 2113 can adjust threshold voltage Vth1 according to the on state of the body diode of the switch, and thus the switch can be turned on immediately after its body diode is turned on in order to compensate the delay of the control circuit during the on stage of the switch. Off threshold voltage generator 2114 can adjust threshold voltage Vth2 according to the on state of the body diode of the switch. Thus, the switch can be turned off immediately before its body diode is turned off in order to compensate the delay of the control circuit during the off stage of the switch.

Figure 6:
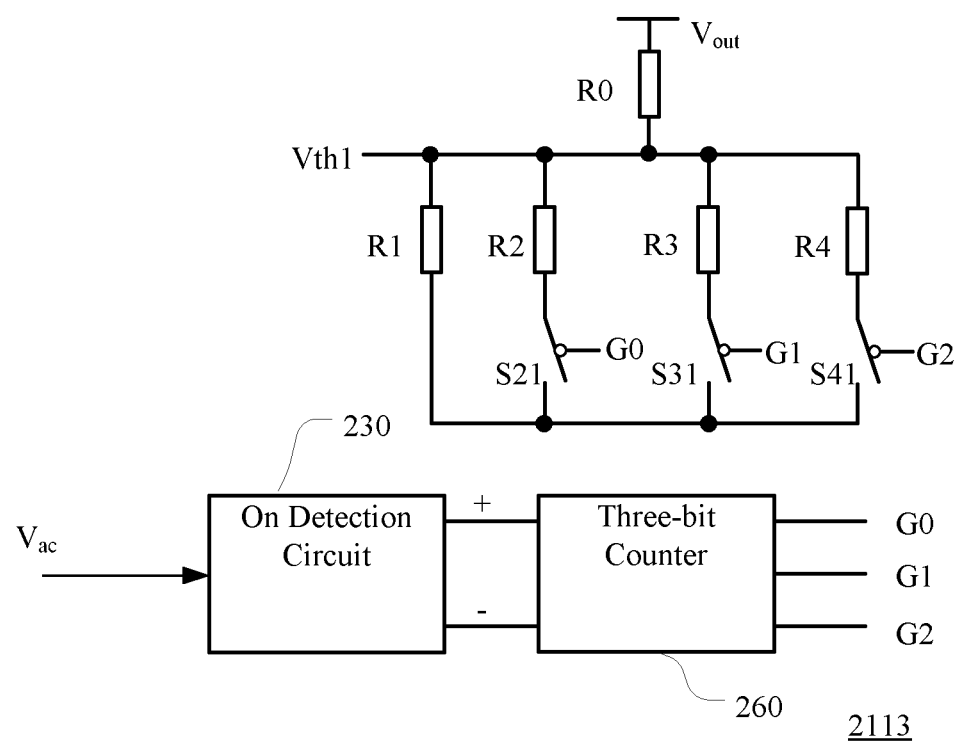
FIGS. 6 and 7 are schematic block diagrams of example on and off threshold voltage generators used in the switching control circuit of FIG. 5, in accordance with embodiments of the present invention.
Figure 7:
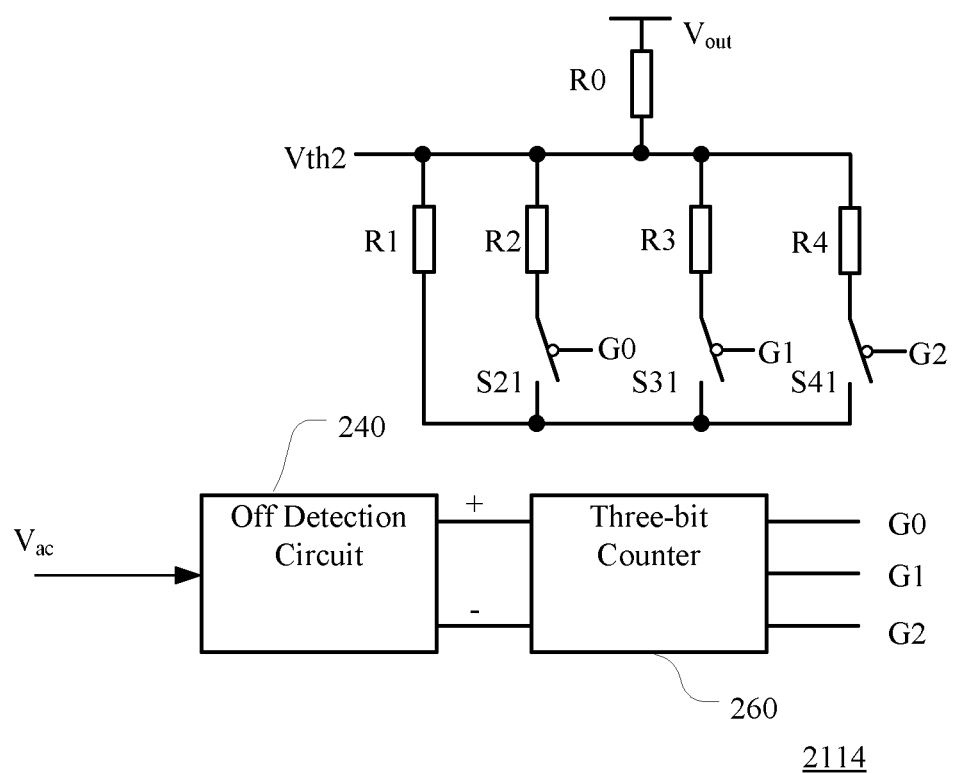

Referring now to FIGS. 6 and 7, shown are schematic block diagrams of example on and off threshold voltage generators used in the switching control circuit of FIG. 5, in accordance with embodiments of the present invention. In FIG. 6, on threshold voltage generator 2113 can include on detection circuit 230, counter 260, resistors R0, R1, R2, R3, and R4, and switches S21 to S41. On detection circuit 230 can receive AC input voltage $V_{ac}$, and during the positive half-cycle, the on state of the body diode of the switch can be detected based on the voltage variation of AC input voltage $V_{ac}$, in order to generate a first adjustment signal. Counter 260 can receive the first adjustment signal, and may perform up/down counting according to the first adjustment signal. Counter 260 (e.g., a three-bit counter) can include one input terminal and a plurality of output terminals, at which adjustment signals G0 to G2 can be provided.

Resistors R0 and R1 can be coupled in series between a constant voltage (e.g., output voltage $V_{out}$ obtained after synchronization and filtering) and ground. Resistors R2 to R4 can respectively connect to switches S21 to S41 between a common node of resistors R0 and R1 and ground. Resistor R0, and resistors R1 to R4, may form a voltage division network such that on detection circuit 230 can generate threshold voltage Vth1 at the common node of resistors R0 and R1. Switches S21 to S41 can be respectively controlled to be on and off by adjustment signals G0 to G2, in order to adjust threshold voltage Vth1 according to the on state of the body diode of the switch. For example, the relationship of the control signal of on detection circuit 230 and threshold voltage Vth1 may be as shown below in Table 1.

TABLE 1

| G0 | G1 | G2 | $V_{th1}$ |
|---|---|---|---|
| 0 | 0 | 0 | 1/9 * $V_{out}$ |
| 1 | 0 | 0 | 1/8 * $V_{out}$ |
| ... | | | |
| 1 | 1 | 1 | 1/2 * $V_{out}$ |

During the on stage of the switch, if on detection circuit 230 detects that the on time of the body diode is greater than a predetermined time before the switch is turned on, counter 260 may perform down counting, and threshold voltage Vth1 can increase. Contrarily, during the on stage of the switch, if on detection circuit 230 detects that the on time of the body diode is less than a predetermined time before the switch is turned on, counter 260 can perform up counting, and threshold voltage Vth1 may decrease. Thus, the delay of the conduction of the switch may be decreased because of the feedback control of threshold voltage Vth1.

In FIG. 7, off threshold voltage generator 2114 can include off detection circuit 240, counter 260, resistors R0, R1, R2, R3, and R4, and switches S21 to S41. Off detection circuit 240 can connect to the first input terminal of the synchronous rectifier circuit, for receiving AC input voltage $V_{ac}$ during the positive half-cycle, and may detect the on state of the body diode of the switch based on the voltage variation of AC input voltage $V_{in}$, in order to generate the first adjustment signal. Counter 260 can receive the first adjustment signal, and may perform up/down counting according to the first adjustment signal. Counter 260 (e.g., a three-bit counter) can include one input terminal and a plurality of output terminals, at which adjustment signals G0 to G2 may be provided. Resistors R0 and R1 can be coupled in series between the constant voltage (e.g., $V_{out}$ obtained after synchronization and filtering) and ground. Resistors R2 to R4 can be respectively coupled to switches S21 to S41 between a common node of resistors R0 and R1 and ground.

Off detection circuit 240 may generate threshold voltage Vth2 at the common node of resistors R0 and R1. Switches S21 to S41 may be controlled to be on and off by adjustment signals G0 to G2, so as to adjust threshold voltage Vth2 according to the on state of the body diode of the switch. For example, the relationship of the control signal of off detection circuit 240 and threshold voltage Vth2 may be as shown below in Table 2.

TABLE 2

| G0 | G1 | G2 | $V_{th2}$ |
|---|---|---|---|
| 0 | 0 | 0 | 1/9 * $V_{out}$ |
| 1 | 0 | 0 | 1/8 * $V_{out}$ |
| ... | | | |
| 1 | 1 | 1 | 1/2 * $V_{out}$ |

During the off stage of the switch, off detection circuit 240 may detect that the on time of the body diode is greater than a predetermined time. Thereafter, the switch can be turned on, counter 260 may perform down counting, and threshold voltage Vth2 can increase. Contrarily, during the on stage of the switch, if off detection circuit 240 detects that the on time of the body diode is less than a predetermined time before the switch is turned on, counter 260 can perform down counting, and threshold voltage Vth2 may increase. Thus, the delay of the shutdown of the switch may be decreased because of the feedback control of threshold voltage Vth2.

Figure 8:
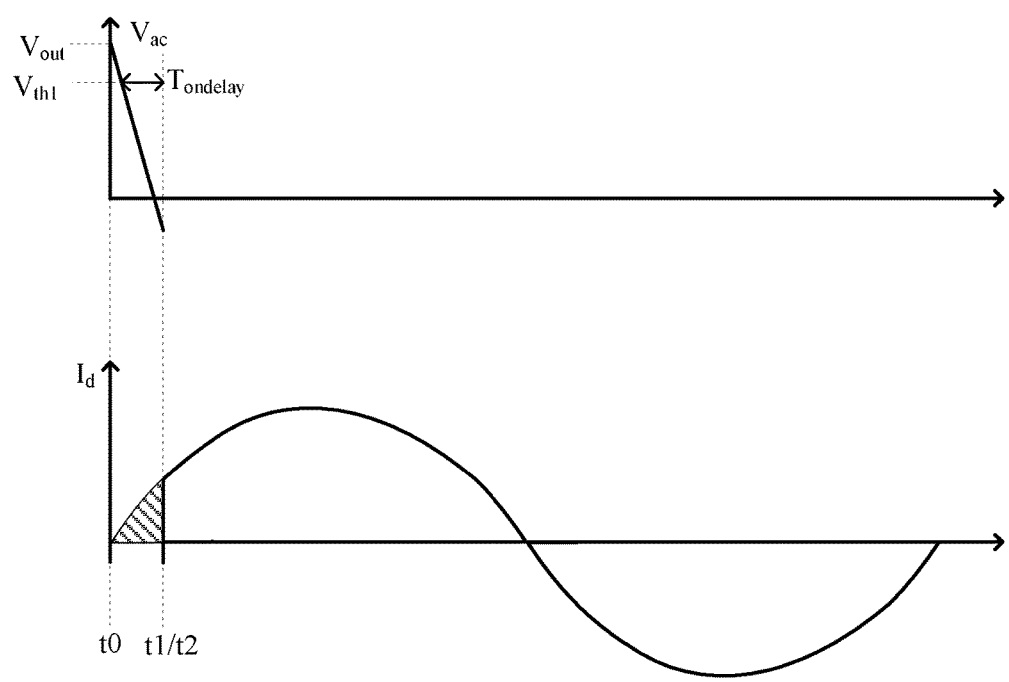
FIGS. 8 and 9 are waveform diagrams of example operation of the switches of the synchronous rectifier circuit of the first example switching control circuit, in accordance with embodiments of the present invention.
Figure 9:
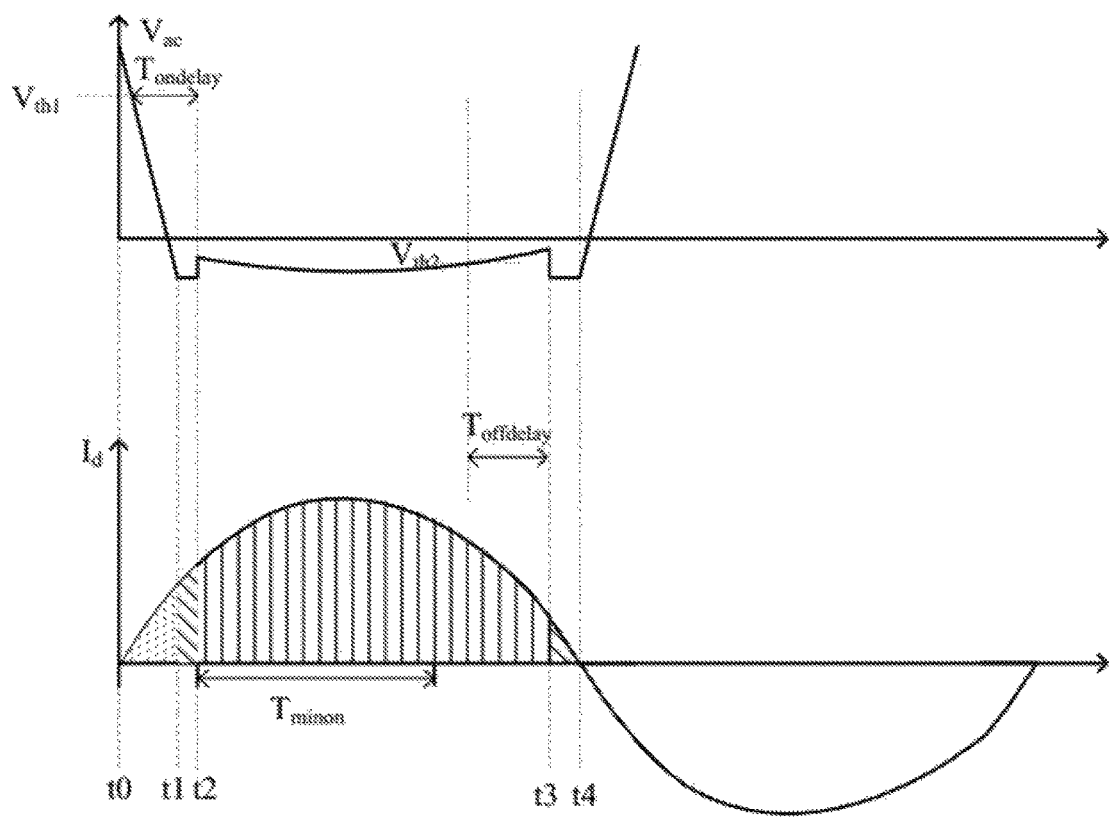

Referring now to FIGS. 8 and 9, shown are waveform diagrams of example operation of the switches of the synchronous rectifier circuit of the first example switching control circuit, in accordance with embodiments of the present invention. This example shows the variation procedure of AC input voltage $V_{ac}$ and AC input current $I_d$. In FIG. 8, from time t0 to time t1, the synchronous rectifier circuit may be in a commutation state, and switches $SR_1$ and $SR_3$ are off. AC input voltage $V_{ac}$ drops at a certain speed. The descending speed may not be a fixed value, and rather may be related to various factors (e.g., a load current, a switch junction capacitance, etc.). Comparator U11 in control circuit 211 can compare the first sampling signal against threshold voltage Vth1. When AC input voltage $V_{ac}$ is detected to be less than threshold voltage Vth1, switches $SR_1$ and $SR_3$ may be ready to be turned on. In this particular example, threshold voltage Vth1 is an adjustable threshold voltage generated by on threshold voltage generator 2113.

Since the steps of processing the current detection signal by the control circuit can include a comparing step, a transmitting step, a driving step, and so on, the control signal may be delayed with respect to the ideal turning on moment. Therefore, from time t1 to time t2, switches $SR_1$ and $SR_3$ may still be off, but the body diodes of switches $SR_1$ and $SR_3$ may already be turned on. At time t2, switches $SR_1$ and $SR_3$ may both be on. When the synchronous rectifier circuit begins rectifying during the positive half-cycle, control signal $V_{G1}$ can be activated. Since the steps of processing the current detection signal by the control circuit can include a comparing step, a transmitting step, a driving step, and so on, the control signal may be delayed with respect to the ideal turning on moment. That is, on delay $T_{ondelay}$ can exist between the time t2 at which control signal $V_{G1}$ is activated, and time t1 at which the first sampling signal of sampling circuit 2111 indicates that AC input voltage $V_{ac}$ is less than threshold voltage Vth1.

In certain embodiments, on threshold voltage generator 2113 may be used in the synchronous rectifier circuit according to generate adjustable threshold voltage Vth1. With the feedback control of threshold voltage Vth1, the synchronous rectifier circuit can self-adjust the operating point of control signal $V_{G1}$ according to the variation of AC input voltage $V_{ac}$. Therefore, the synchronous rectifier circuit can adjust threshold voltage Vth1 according to the on state of the body diode of the switch, such that the switch can be turned on immediately after its body diode is turned on for a first predetermined time, in order to compensate the delay of the control circuit during the on stage of the switch. For example, the first predetermined time may be approximately zero, such that the switch is turned on immediately when the body diode is turned on. Thus, the synchronous rectifier circuit can reduce delay $T_{ondelay}$ of the actual on point of control signal $V_{G1}$ with respect to the ideal on point, in order to improve the system efficiency by reducing switching power losses during the on stage of the synchronous rectifier circuit.

In FIG. 9, from time t2 to time t3, the synchronous rectifier circuit may be in a rectifier state of the positive half-cycle, and switches $SR_1$ and $SR_3$ can both be on. The voltages at the input and output terminals of the synchronous rectifier circuit may vary in synchronization. In the rectifier stage of the positive half-cycle, AC input voltage $V_{ac}$ can begin increasing and then decreasing. Comparator U13 in control circuit 211 can compare the first sampling signal against threshold voltage Vth2. When AC input voltage $V_{ac}$ is detected to be greater than threshold voltage Vth2, switches $SR_1$ and $SR_3$ may be ready to be turned off. For example, threshold voltage Vth2 is an adjustable threshold voltage generated by off threshold voltage generator 2114.

Since the steps of processing the current detection signal by the control circuit can include a comparing step, a transmitting step, a driving step, and so on, the control signal may be delayed with respect to the ideal turning off moment. Thus, switches $SR_1$ and $SR_3$ may both be off at time t3. That is, an off delay $T_{offdelay}$ can exist between the time t3 at which control signal $V_{G1}$ goes inactive, and time t4 at which the first sampling signal of sampling circuit 2111 indicates that AC input voltage $V_{ac}$ is greater than threshold voltage Vth2. From time t3 to time t4, switches $SR_1$ and $SR_3$ may both be off, while the body diodes of switches $SR_1$ and $SR_3$ remain on. Until time t4, the body diodes of switches $SR_1$ and $SR_3$ may both be off.

In particular embodiments, off threshold voltage generator 2114 can be used in the synchronous rectifier circuit to generate adjustable threshold voltage Vth2. With the feedback control of threshold voltage Vth2, the synchronous rectifier circuit can self-adjusts the operating point of control signal $V_{G1}$ according to the variation of AC input voltage $V_{ac}$. Therefore, the synchronous rectifier circuit can adjust threshold voltage Vth2 according to the on state of the body diode of the switch, such that the switch can be turned off at a second predetermined time before its body diode is turned on, in order to compensate the delay of the control circuit during the off stage of the switch. In this example, the second predetermined time may be approximately zero, whereby the switch is turned off immediately before the body diode is turned off. Thus, the synchronous rectifier circuit can reduce delay $T_{offdelay}$ of the actual off point of control signal $V_{G1}$ with respect to the ideal off point, in order to improve the system efficiency by reducing switching power losses during the off stage of the synchronous rectifier circuit.

Figure 10:
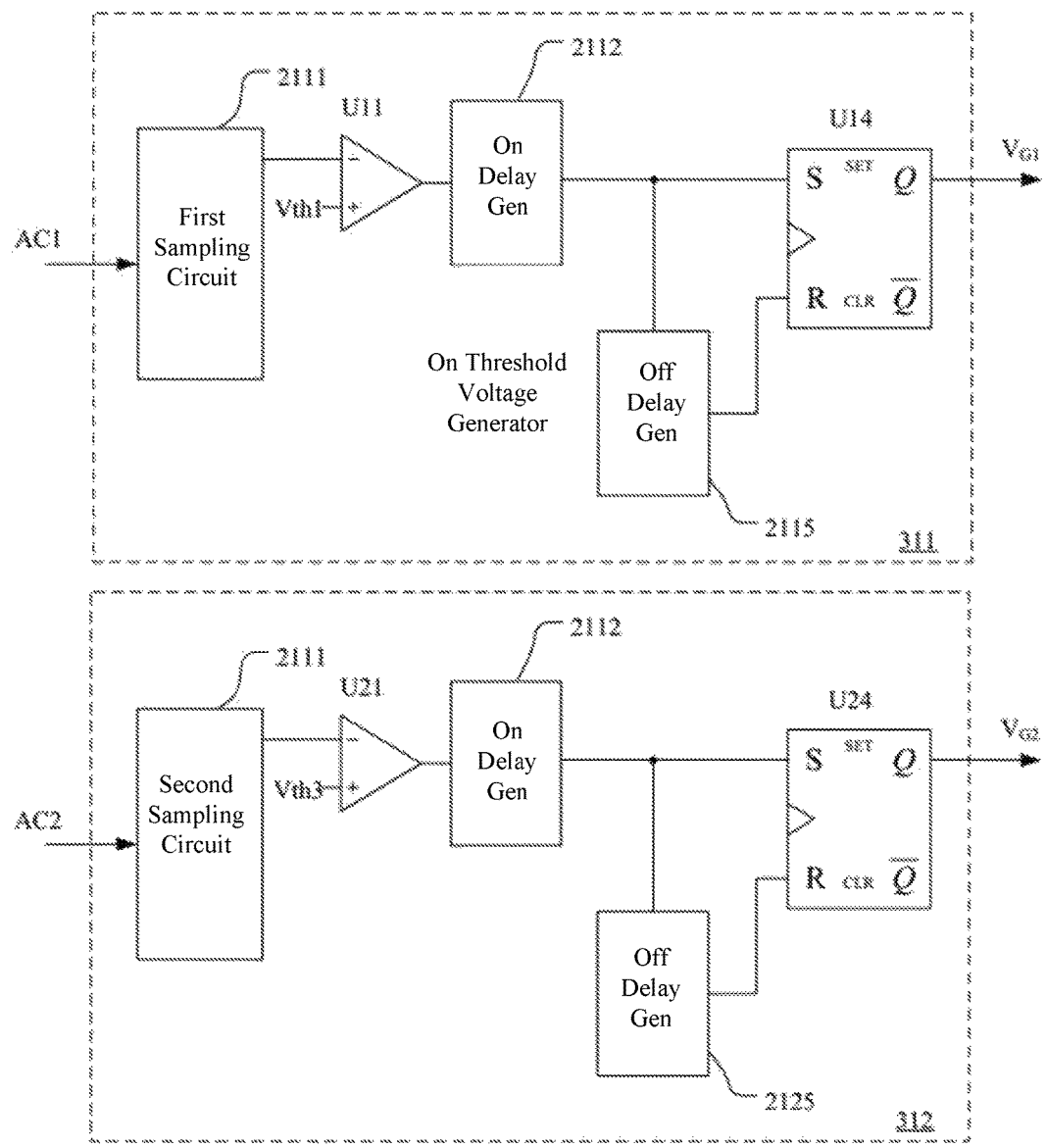
FIG. 10 is a schematic block diagram of a second example switching control circuit used in a synchronous rectifier circuit, in accordance embodiments of the present invention.

Referring now to FIG. 10, shown is a schematic block diagram of a second example switching control circuit used in a synchronous rectifier circuit, in accordance embodiments of the present invention. Switching control circuit 310 can include control circuit 311 for generating control signal $V_{G1}$ according to an input signal at input terminal AC1, and control circuit 312 for generating control signal $V_{G2}$ according to an input signal at input terminal AC2. Control circuit 311 can include sampling circuit 2111, on delay generator 2112, off delay generator 2115, comparator U11, and RS flip-flop U14. Sampling circuit 2111 can connect to the first input terminal, and may generate a first sampling signal that represents AC input voltage $V_{ac}$ during the positive half-cycle of the AC input voltage $V_{ac}$. On delay generator 2112 can generate a time interval, such as an on delay between the on time of switches $SR_1$ and $SR_3$, and the on time of switches $SR_2$ and $SR_4$. During the on delay, switches $SR_1$-$SR_4$ may all be off, such that that the possible false circumstance of all the switches being on can be avoided.

Control circuit 312 can include sampling circuit 2121, on delay generator 2112, off delay generator 2115, comparator U21, and RS flip-flop U24. Sampling circuit 2121 can connect to the second input terminal, and may generate a second sampling signal that represents AC input voltage $V_{ac}$ during the negative half-cycle of AC input voltage $V_{ac}$. On delay generator 2112 can generate a time interval, such as a commutation delay between the on time of switches $SR_2$ and $SR_4$, and the on time of switches $SR_1$ and $SR_3$. During the commutation delay, switches $SR_1$-$SR_4$ may all be off, such that the possible false circumstance of all the switches being on can be avoided.

In particular embodiments, switching control circuit 310, and control circuits 311 and 312 used in the synchronous rectifier circuit can also include on delay generator 2112 and off time delay generator 2115. An input terminal of off delay generator 2115 can connect to an output terminal of the on delay generator 2112. On delay generator 2112 and off delay generator 2115 can respectively generate an on signal for adjusting the commutation delay, and an off signal for adjusting the rectifier time, in order to self-adjust the operating point of control signal $V_{G1}$ according to the variation of AC input voltage $V_{ac}$. On delay generator 2112 can generate a time interval between the on time of switches $SR_1$ and $SR_3$, and the on time of switches $SR_2$ and $SR_4$, such as for delaying the first comparison signal. During the delay stage of the first comparison signal, switches SR$_1$ and SR$_4$ may both be off.

In control circuit 311, on delay generator 2112 can generate an adjustable commutation delay according to AC input voltage V$_{ac}$, and off delay generator 2115 may generate an adjustable rectifier time according to AC input voltage V$_{ac}$. During the on stage of the switches, if the on point of the switch is delayed with respect to the ideal on point, the body diode of the switch may be turned on in advance. During the off stage of the switches, if the off point of the switch is delayed with respect to the ideal off point, the body diode of the switch can be turned off in advance. As the body diode is turned on in the function of the bias voltage, the turning on and off moments of the body diode may not be affected by the delay of the control circuit, and instead may always near the ideal on point and the ideal off point.

When the switch is off but its body diode is turned on, the synchronous rectifier circuit may be used as the load of the AC input voltage, such the AC input voltage is approximately constant. Thus, the on state of the body diode of the switch can be detected according to the variation of the AC input voltage, to further determine the ideal on point and off point. On delay generator 2112 can adjust the commutation delay according to the on state of the body diode of the switch, such that the switch can be turned on immediately after its body diode is turned on, which can compensate the delay of the control circuit during the on stage of the switch. Off delay generator 2115 can adjust the rectifier time according to the on state of the body diode of the switch. Thus, the switch can be turned off immediately before its body diode is turned off, in order to compensate the delay of the control circuit during the off stage of the switch.

Figure 11:
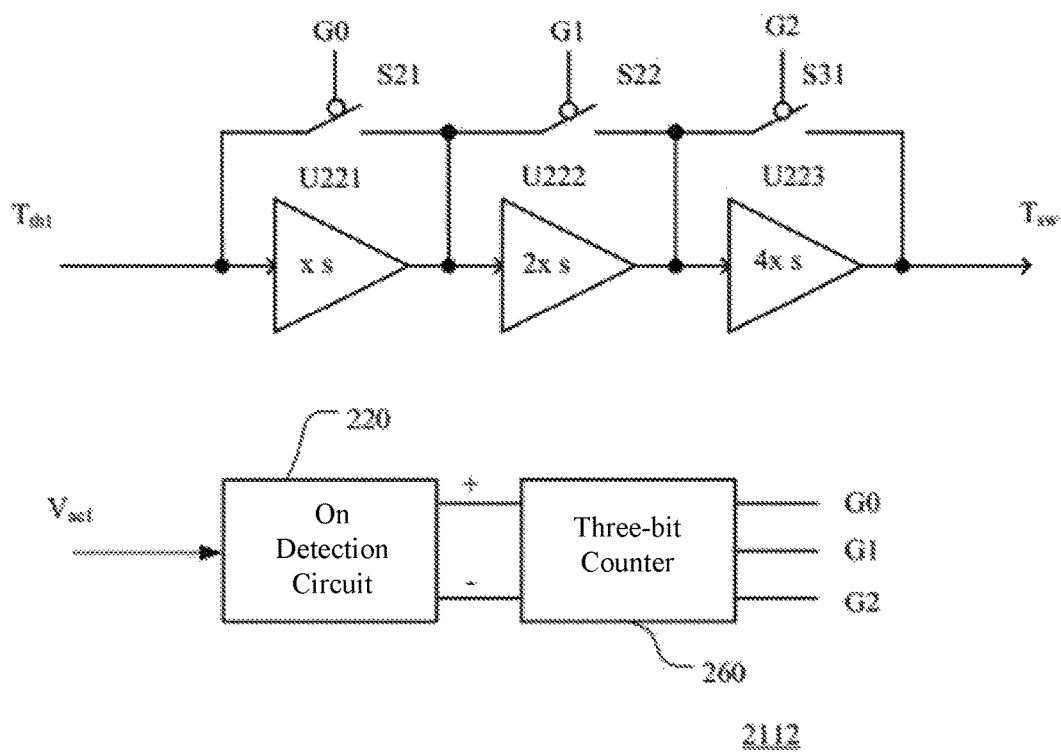
FIGS. 11 and 12 are schematic block diagrams of example on and off threshold voltage generators used in the switching control circuit of FIG. 10, in accordance with embodiments of the present invention.
Figure 12:
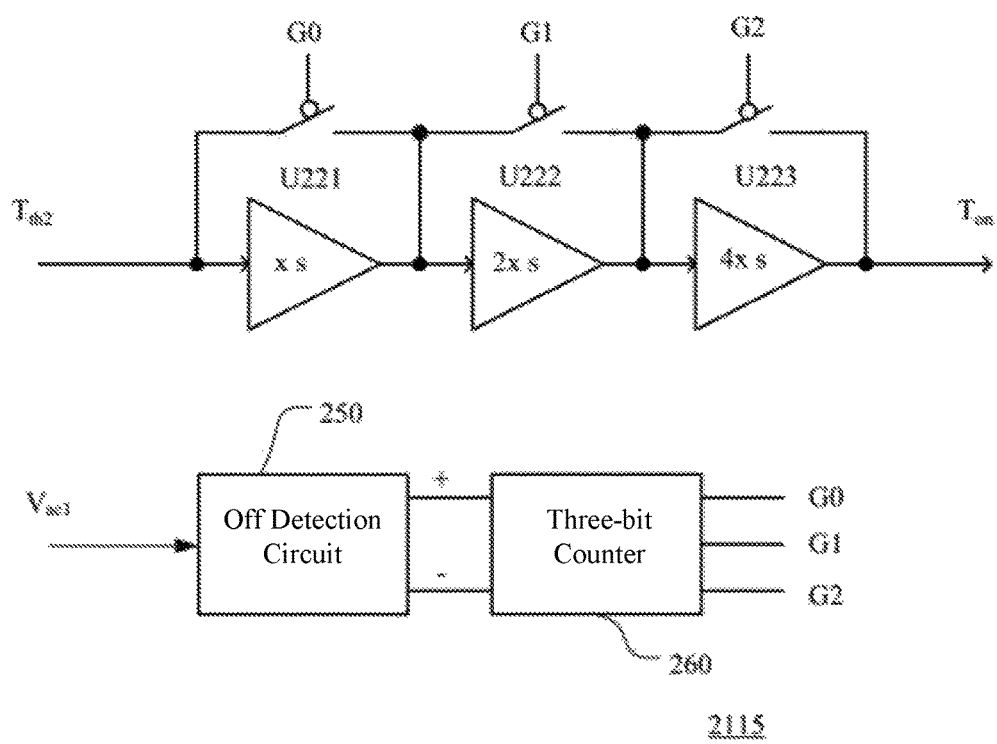

Referring now to FIGS. 11 and 12, shown are schematic block diagrams of example on and off threshold voltage generators used in the switching control circuit of FIG. 10, in accordance with embodiments of the present invention. In the switching control circuit of FIG. 10, the operating principles of control circuits 311 and 312 are similar to each other, and the following will describe control circuit 311 as an example to explain the self-adjustment of the operating point of control signal V$_{G1}$.

In FIG. 11, on delay generator 2112 can include on detection circuit 230, counter 260, delay units U221 to U223, and switches S21 to S23. On detection circuit 230 can connect to the first input terminal of the synchronous rectifier circuit, for receiving AC input voltage V$_{ac}$ during the positive half-cycle, and detecting the on state of the body diode of the switch based on the voltage variation of AC input voltage V$_{in}$, in order to generate a first adjustment signal. Counter 260 can receive the first adjustment signal, and may perform up/down counting according to the first adjustment signal. Counter 260 (e.g., a three-bit counter) can include one input terminal and a plurality of output terminals, at which adjustment signals G0 to G2 may be provided.

Delay units U221 to U223 can be coupled in series, such as for multiplying reference delay T$_{th1}$ times to generate commutation delay T$_{sw}$. Delay units U221 to U223 can be respectively coupled to switches S21 to S23 in parallel. When the switches are turned on, an input terminal and an output terminal of a corresponding delay unit can be effectively shorted, so as to change commutation delay T$_{sw}$. In one example, the relationship of the control signal of on detection circuit 230 and commutation delay T$_{sw}$ can be as shown below in Table 3.

TABLE 3

| G0 | G1 | G2 | Tsw |
|---|---|---|---|
| 0 | 0 | 0 | 7 * Tth1 |
| 1 | 0 | 0 | 6 * Tth1 |
| ... | | | |
| 1 | 1 | 1 | 0 * Tth1 |

During the on stage of the switch, if on detection circuit 230 detects that the on time of the body diode is greater than a predetermined time before the switch is turned on, counter 260 can perform up counting, and commutation delay T$_{sw}$ may decrease. Contrarily, during the on stage of the switch, if on detection circuit 230 detects that the on time of the body diode is less than a predetermined time before the switch is turned on, counter 260 can perform down counting, and commutation delay T$_{sw}$ may increase. Thus, the delay of the conduction of the switch can be decreased because of the feedback control of commutation delay T$_{sw}$.

In FIG. 12, off delay generator 2115 can include off detection circuit 240, counter 260, delay units U221 to U223, and switches S21 to S23. Off detection circuit 240 can connect to the first input terminal of the synchronous rectifier circuit, for receiving AC input voltage V$_{ac}$ during the positive half-cycle, and detecting the on state of the body diode of the switch based on the voltage variation of AC input voltage V$_{ac}$, in order to generate the first adjustment signal. Counter 260 can receive the first adjustment signal, and may perform up/down counting according to the first adjustment signal. Counter 260 (e.g., a three-bit counter) can include one input terminal and a plurality of output terminals, at which adjustment signals G0 to G2 may be provided.

Delay units U221 to U223 can be coupled in series, for multiplying reference delay T$_{th2}$ times in order to generate rectifier time T$_{on}$. Delay units U221 to U223 may be respectively coupled to switches S21 to S31 in parallel, such that an input terminal and an output terminal of a corresponding delay unit are effectively shorted when the switches are turned on, so as to adjust rectifier time T$_{on}$. For example, the relationship of the control signal of off detection circuit 240 and rectifier time T$_{on}$ may be as shown below in Table 4.

TABLE 4

| G0 | G1 | G2 | Ton |
|---|---|---|---|
| 0 | 0 | 0 | 7 * Tth2 |
| 1 | 0 | 0 | 6 * Tth2 |
| ... | | | |
| 1 | 1 | 1 | 0 * Tth2 |

During the off stage of the switch, if off detection circuit 240 detects that the on time of the body diode is greater than a predetermined time after the switch is turned off, counter 260 can perform up counting, and the rectifier time Ton may decrease. Contrarily, during the on stage of the switch, if off detection circuit 240 detects that the on time of the body diode is less than a predetermined time before the switch is turned on, counter 260 can perform down counting, and rectifier time T$_{on}$ may increase. Thus, the delay of the conduction of the switch can be decreased because of the feedback control of rectifier time T$_{on}$.

Figure 13:
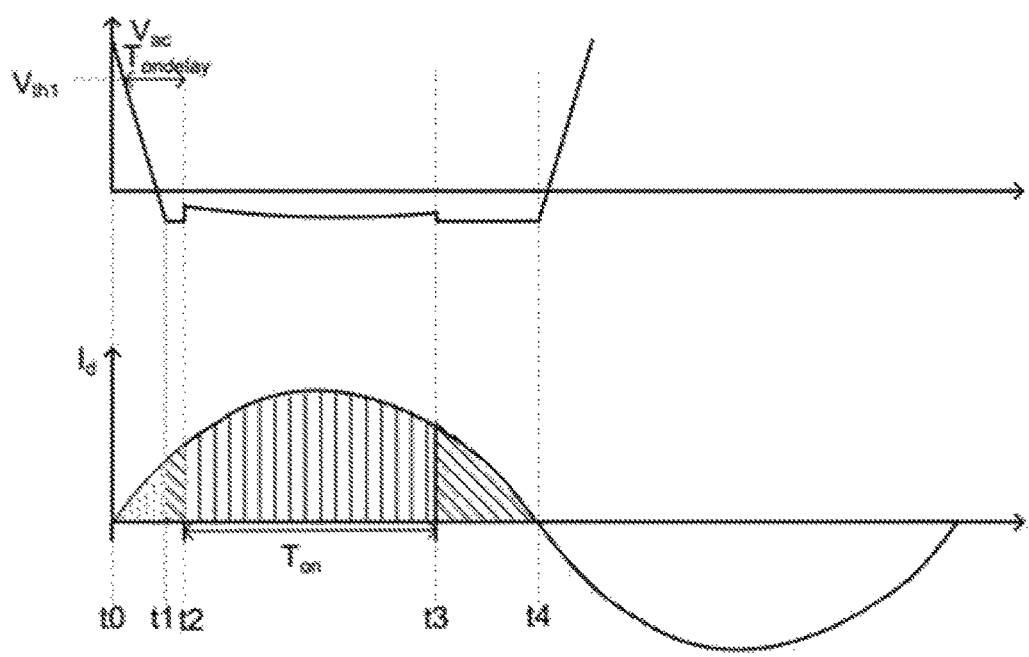
FIG. 13 is a waveform diagram of example operation of switches of the second example switching control circuit, and which is deviated from an ideal off point in the off stage, in accordance with embodiments of the present invention.

Referring now to FIG. 13, shown is a waveform diagram of example operation of switches of the second example switching control circuit, and which is deviated from an ideal off point in the off stage, in accordance with embodiments of the present invention. From time t2 to time t3, the synchronous rectifier circuit may be in a rectification state of the positive half-cycle, switches $SR_1$ and $SR_3$ may both be on. The voltages at the input terminal and the output terminal of the synchronous rectifier circuit vary in synchronization. In the rectifier stage of the positive half-cycle, AC input voltage $V_{ac}$ can begin increasing and then decreasing. Off delay generator 2115 in control circuit 111 can generate an off signal that is activated a predetermined time after the on signal is activated, and switches $SR_1$ and $SR_3$ may be ready to be turned off. For example, the predetermined time may be the rectifier time $T_{on}$ of the synchronous rectifier circuit during the positive half-cycle of AC input voltage $V_{ac}$.

At time t3, synchronous rectifier circuit may complete rectification during the positive half-cycle, and control signal $V_{G1}$ can be deactivated. Since the steps of processing the current detection signal by the control circuit may include a comparing step, a transmitting step, a driving step, and so on, the control signal may be delayed with respect to the ideal turning off moment. FIG. 13 shows the circumstance that, e.g., switches $SR_1$ and $SR_3$ are deviating from the ideal off point because switches $SR_1$ and $SR_3$ are turned off too early. Since the zero-crossing point of AC input voltage $V_{ac}$ is at time t4, the rectifier stage of the synchronous rectifier circuit during the positive half-cycle may end before the zero-crossing point of AC input voltage $V_{ac}$. If AC input voltage $V_{ac}$ is a high frequency signal, the switching losses may significantly reduce the system efficiency.

Figure 14:
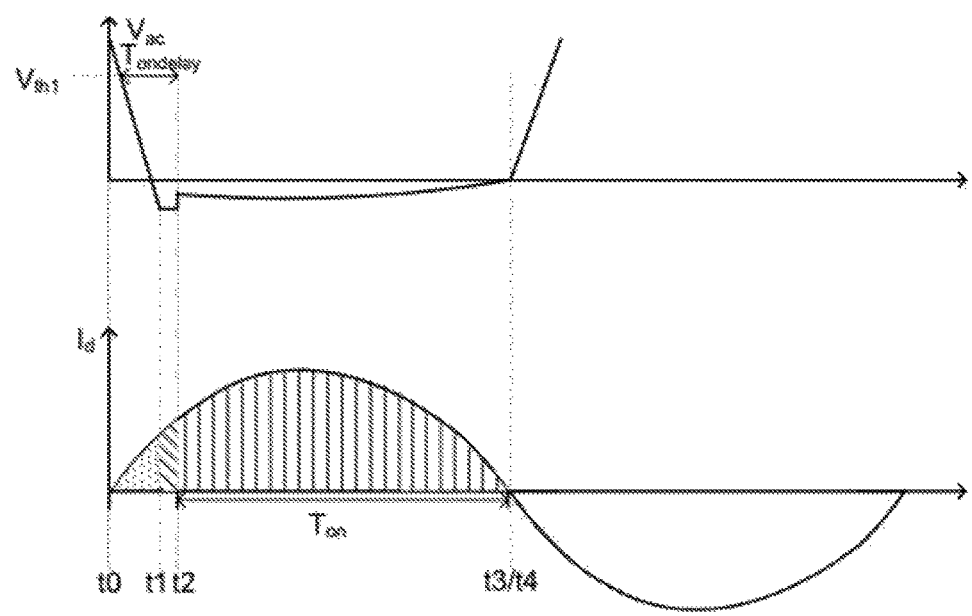
FIG. 14 is a waveform diagram of example operation of switches of the second example switching control circuit, and at a point which is close to an ideal off point in the off stage, in accordance with embodiments of the present invention.

Referring now to FIG. 14, shown is a waveform diagram of example operation of switches of the second example switching control circuit, and at a point which is close to an ideal off point in the off stage, in accordance with embodiments of the present invention. From time t2 to time t3, the synchronous rectifier circuit may be in a rectification state of the positive half-cycle, and switches $SR_1$ and $SR_3$ are both on. The voltages at the input and output terminals of the synchronous rectifier circuit vary in synchronization. In the rectifier stage of the positive half-cycle, AC input voltage $V_{ac}$ can begin increasing, and then decreasing.

Off delay generator 2115 in control circuit 111 may generate an off signal that is activated a predetermined time after the on signal is activated, and switches $SR_1$ and $SR_3$ may be ready to be turned off. For example, the predetermined time may be rectifier time $T_{on}$ of the synchronous rectifier circuit during the positive half-cycle of AC input voltage $V_{ac}$. At time t3, synchronous rectifier circuit can complete rectification during the positive half-cycle, and control signal $V_{G1}$ may be deactivated. FIG. 13 shows the circumstance that, e.g., switches $SR_1$ and $SR_3$ are turned off in an ideal timing. Since the zero-crossing point of AC input voltage $V_{ac}$ is at time t4, the synchronous rectifier circuit may control rectifier time $T_{on}$ to end the rectifier stage during the positive half-cycle near the zero-crossing point of AC input voltage $V_{ac}$.

In particular embodiments, off delay generator 2115 may be used in the synchronous rectifier circuit in order to generate adjustable rectifier time $T_{on}$. With the feedback control of rectifier time $T_{on}$, the synchronous rectifier circuit can self-adjust the operating point of control signal $V_{G1}$ according to the variation of AC input voltage $V_{ac}$. Therefore, the synchronous rectifier circuit can adjust rectifier time $T_{on}$ according to the on state of the body diode of the switch, such that the switch can be immediately turned off at a second predetermined time before its body diode is turned on, in order to compensate the delay of the control circuit during the off stage of the switch. In this example, the second predetermined time can be approximately zero, such that the switch is turned off immediately before the body diode is turned off. Thus, the off point of the switch may be moved up before the zero-crossing point of the synchronous rectifier circuit, in order to prevent the switch from turning off too early and too late. Thus, the synchronous rectifier circuit can reduce delay $T_{offdelay}$ of the actual off point of control signal $V_{G1}$ with respect to the ideal off point, in order to improve system efficiency by reducing the switching power losses during the off stage of the synchronous rectifier circuit.

Figure 15:
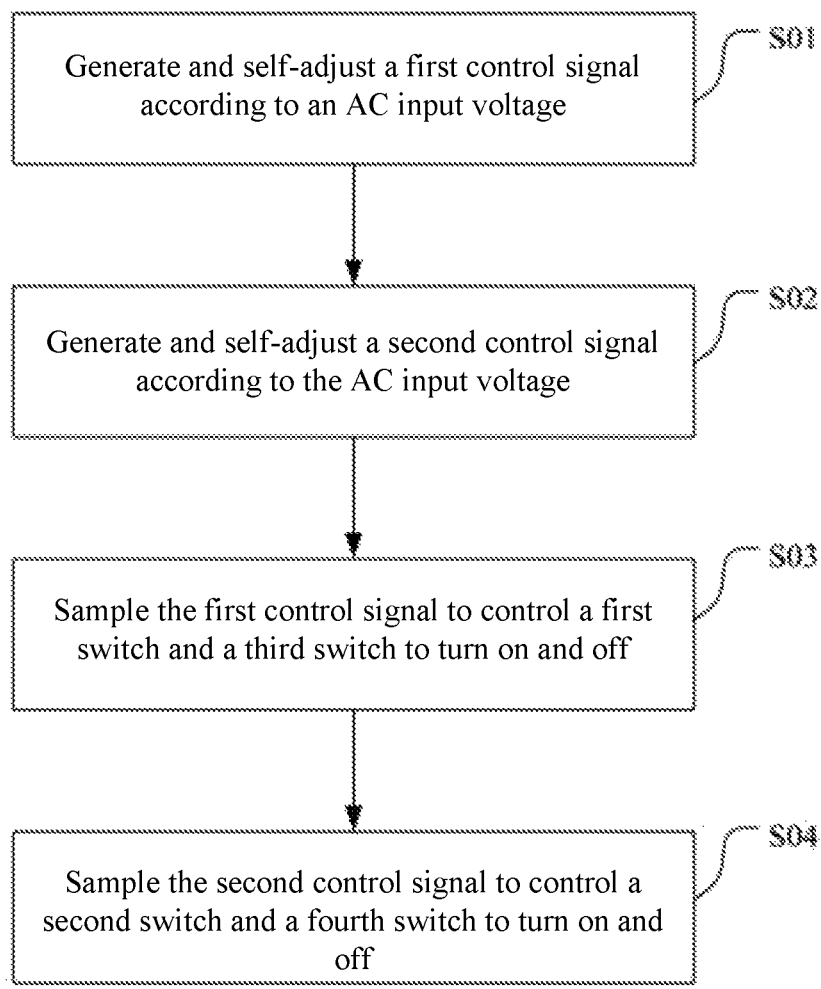
FIG. 15 is a flow diagram of an example method of controlling a synchronous rectifier circuit, in accordance with embodiments of the present invention.

Referring now to FIG. 15, shown is a flow diagram of an example method of controlling a synchronous rectifier circuit, in accordance with embodiments of the present invention. This particular control method can be used, e.g., in the synchronous rectifier circuit of FIG. 1, which can include switches $SR_1$, $SR_2$, $SR_3$, and $SR_4$ to form a full-bridge rectifier circuit, for converting an AC input voltage to a DC input voltage.

At S01, a first control signal (e.g., $V_{G1}$) can be and self-adjusted according to an AC input voltage (e.g., $V_{ac}$). At S02, a second control signal (e.g., $V_{G2}$) can be and self-adjusted according to the AC input voltage. At step S03, first and third switches (e.g., $SR_1$ and $SR_3$) can be controlled to turned on/off by the first control signal. At step S04, second and fourth switches (e.g., $SR_2$ and $SR_4$) can be controlled to turned on/off by the second control signal. At steps S01 and S02, the operating points of the first, second, third, and fourth switches may approximately the ideal operating points by self-adjusting the first and second control signals.

For example, the self-adjustment can include determining the on states of body diodes of the first, second, third, and fourth switches according to the AC input voltages received between the first and second input terminals, and generating the first and second control signals according to the on states of the body diodes in order to adjust the operating points. The step of self-adjustment may also include turning on the first, second, third, and fourth switches at a first predetermined time, respectively, after their body diodes are turned on during the on stage, and turning off the first, second, third, and fourth switches at a second predetermined time, respectively, before their body diodes are turned off during the off stage.

The step of generating the first and second control signals can include generating a first comparison signal by comparing a sampling signal of the AC input voltage against a first threshold voltage. Also, this step can include generating an on signal by performing commutation delay on the first comparison signal. Also, this step can include generating an off signal by comparing the sampling signal of the AC input voltage against a second threshold voltage. Also, this step can include generating one of the first and second control signals according to the on signal and the off signal, and adjusting the first and second threshold voltages according to the on states of the body diodes, in order to adjust the operating points.

For example, the step of generating the first and second control signals can include generating the first comparison signal by comparing the sampling signal of the AC input voltage against the first threshold voltage. This step can also include generating the on signal by performing commutation delay on the first comparison signal. This step can also include generating the off signal by performing rectifier delay on the on signal. This step can also include generating one of the first and second control signals according to the on signal and the off signal, and adjusting the commutation delay and the rectifier delay according to the on states of the body diodes, in order to adjust the operating points.

From the above description, four switches may be used in a synchronous rectifier circuit of particular embodiments in order to convert an AC input to a DC output. The synchronous rectifier circuit can be used in electronic transformers, or energy receivers in a wireless charging apparatus, as just a couple of examples. In addition, while a rectifier of the AC input voltage with a sine-wave envelope is described herein, other waveforms or input voltages can also be supported in certain embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A synchronous rectifier circuit, comprising:
   a) a full-bridge rectifier circuit having first, second, third, and fourth switches, wherein a common node of said first and fourth switches is configured as a first input terminal of said synchronous rectifier circuit, and a common node of said second and third switches is configured as a second input terminal of said synchronous rectifier circuit;
   b) a switching control circuit comprising a first control circuit configured to generate a first control signal in accordance with a first input voltage at said first input terminal to control said first and third switches, and a second control circuit configured to generate a second control signal in accordance with a second input voltage at said second input terminal to control said second and fourth switches; and
   c) said switching control circuit being configured to offset an intrinsic delay of said synchronous rectifier circuit to control operating points of said first, second, third, and fourth switches to be approximately ideal operating points.

2. The synchronous rectifier circuit of claim 1, wherein said switching control circuit is configured to:
   a) determine on states of body diodes of said first, second, third, and fourth switches according to an AC input voltages received between said first and second input terminals; and
   b) generate said first and second control signals according to said on states of said body diodes to adjust said operating points.

3. The synchronous rectifier circuit of claim 2, wherein:
   a) said first, second, third, and fourth switches are respectively turned on at a first predetermined time after corresponding body diodes are turned on during an on stage;
   b) said first, second, third, and fourth switches are respectively turned off at a second predetermined time before corresponding body diodes are turned off during an off stage; and
   c) said first and second predetermined times are each approximately zero.

4. The synchronous rectifier circuit of claim 2, wherein said switching control circuit comprises:
   a) a first control circuit coupled to said first input terminal, and being configured to receive said AC input voltage during a positive half-cycle of said AC input voltage, wherein said first control circuit is configured to generate said first control signal; and
   b) a second control circuit coupled to said second input terminal, and being configured to receive said AC input voltage during a negative half-cycle of said AC input voltage, wherein said second control circuit is configured to generate said second control signal.

5. The synchronous rectifier circuit of claim 4, wherein each of said first and second control circuits comprises:
   a) an on threshold voltage generator configured to generate a first threshold voltage according to said AC input voltage;
   b) an off threshold voltage generator configured to generate a second threshold voltage according to said AC input voltage;
   c) a sampling circuit configured to generate a sampling signal to represent said AC input voltage;
   d) a first comparator configured to receive said sampling signal, and to generate a first comparison signal by comparing said first threshold voltage against said sampling signal;
   e) a second comparator configured to receive said sampling signal, and to generate an off signal by comparing said second threshold voltage against said sampling signal;
   f) an on delay generator configured to generate a commutation delay, and to generate an on signal by delaying said first comparison signal; and
   g) an RS flip-flop configured to receive said on signal and said off signal, and to generate one of said first and second control signals.

6. The synchronous rectifier circuit of claim 5, wherein said on threshold voltage generator comprises:
   a) an on detection circuit configured to detect on states of body diodes of switches according to a voltage variation of said AC input voltage, and to generate a first adjustment signal;
   b) a counter configured to perform counting according to said first adjustment signal, and to provide a plurality of second adjustment signals according to a plurality of data bits of a count value; and
   c) a voltage division network having a plurality of resistors and a plurality of switches, wherein said plurality of second adjustment signals are used to control corresponding of said plurality of switches to adjust said first threshold voltage.

7. The synchronous rectifier circuit of claim 5, wherein said off threshold voltage generator comprises:
   a) an off detection circuit configured to detect on states of body diodes of switches according to voltage variation of said AC input voltage, and to generate a first adjustment signal;
   b) a counter configured to perform counting according to said first adjustment signal, and to provide a plurality of second adjustment signals according to a plurality of data bits of a count value; and
   c) a voltage division network having a plurality of resistors and a plurality of switches, wherein said plurality of second adjustment signals are used to control said plurality of switches respectively to adjust said second threshold voltage.

8. The synchronous rectifier circuit of claim 4, wherein each of said first and second control circuits comprises:
   a) a sampling circuit configured to generate a sampling signal that represents said AC input voltage;
   b) a first comparator configured to receive said sampling signal, and to generate a first comparison signal by comparing said first threshold voltage against said sampling signal;

c) an on delay generator configured to generate a commutation delay, and to generate an on signal by delaying said first comparison signal;
d) an off delay generator configured to generate a rectifier delay, and to generate an off signal by delaying rectifier time; and
e) an RS flip-flop configured to receive said on signal and said off signal, and to generate one of said first and second control signals.

9. The synchronous rectifier circuit of claim 8, wherein said on threshold voltage generator comprises:
a) an on detection circuit configured to detect on states of body diodes of switches according to voltage variation of said AC input voltage, and to generate a first adjustment signal;
b) a counter configured to perform counting according to said first adjustment signal, and to provide a plurality of second adjustment signals according to a plurality of data bits of a count value;
c) a plurality of delay units coupled in series; and
d) a plurality of switches coupled in parallel to said plurality of delay units in parallel, wherein said plurality of second adjustment signals are used to control said plurality of switches such that said commutation delay is generated according to a first reference delay, and said commutation delay is adjusted according to said on states of said body diodes.

10. The synchronous rectifier circuit of claim 8, wherein said off threshold voltage generator comprises:
a) an off detection circuit configured to detect on states of body diodes of switches according to voltage variation of said AC input voltage, and to generate a first adjustment signal;
b) a counter configured to perform counting according to said first adjustment signal, and to provide a plurality of second adjustment signals according to a plurality of data bits of a count value;
c) a plurality of delay units being coupled in series; and
d) a plurality of switches coupled in parallel to said plurality of delay units in parallel respectively, wherein said plurality of second adjustment signals are used to control said plurality of switches such that said rectifier time is generated according to a second reference delay, and said rectifier time is adjusted according to said on states of said body diodes.

11. A method of controlling a synchronous rectifier circuit for converting an AC input voltage across first and second input terminals to a DC input voltage, and having first, second, third, and fourth switches configured to form a full-bridge rectifier circuit, the method comprising:
a) generating, by a first control circuit, a first control signal according to a first input voltage at said first input terminal;
b) generating, by a second control circuit, a second control signal according to a second input voltage at said second input terminal;
c) controlling said first and third switches by said first control signal;
d) controlling said second and fourth switches by said second control signal; and
e) offsetting an intrinsic delay of said synchronous rectifier circuit to control operating points of said first, second, third, and fourth switches to approximately be ideal operating points.

12. The method of claim 11, further comprising:
a) determining on states of body diodes of said first, second, third, and fourth switches according to said AC input voltage; and
b) generating said first and second control signals according to said on states of said body diodes to adjust said operating points.

13. The method of claim 12, wherein:
a) said first, second, third, and fourth switches are respectively turned on at a first predetermined time after corresponding body diodes are turned on during an on stage; and
b) said first, second, third, and fourth switches are respectively turned off at a second predetermined time before corresponding body diodes are turned off during an off stage.

14. The method of claim 13, wherein said generating said first and second control signals comprises:
a) generating a first comparison signal by comparing a sampling signal of said AC input voltage against a first threshold voltage;
b) generating an on signal by performing a commutation delay on said first comparison signal;
c) generating an off signal by comparing said sampling signal of said AC input voltage against a second threshold voltage;
d) generating one of said first and second control signals according to said on signal and said off signal; and
e) adjusting said first and second threshold voltages according to said on states of said body diodes to adjust said operating points.

15. The method of claim 13, wherein said generating said first and second control signals comprises:
a) generating a first comparison signal by comparing a sampling signal of said AC input voltage against a first threshold voltage;
b) generating an on signal performing a commutation delay on said first comparison signal;
c) generating an off signal by delaying said on signal by a rectifier time;
d) generating one of said first and second control signals according to said on signal and said off signal; and
e) adjusting said commutation delay and said rectifier time according to said on states of said body diodes to adjust said operating points.

* * * * *